US008969456B2

(12) United States Patent
Satrijo et al.

(10) Patent No.: US 8,969,456 B2
(45) Date of Patent: Mar. 3, 2015

(54) METHOD OF MAKING A HOT MELT PRESSURE-SENSITIVE ADHESIVE

(75) Inventors: Andrew Satrijo, St. Paul, MN (US); Megan P. Lehmann, Stillwater, MN (US); Michael D. Crandall, North Oaks, MN (US); Craig E. Hamer, Woodbury, MN (US); Robert D. Waid, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/377,711

(22) PCT Filed: Jun. 9, 2010

(86) PCT No.: PCT/US2010/037878
§ 371 (c)(1),
(2), (4) Date: Dec. 12, 2011

(87) PCT Pub. No.: WO2010/147811
PCT Pub. Date: Dec. 23, 2010

(65) Prior Publication Data
US 2012/0083570 A1 Apr. 5, 2012

Related U.S. Application Data

(60) Provisional application No. 61/218,173, filed on Jun. 18, 2009.

(51) Int. Cl.
| | |
|---|---|
| *C09J 133/08* | (2006.01) |
| *C09J 133/10* | (2006.01) |
| *C08K 5/098* | (2006.01) |
| *C08L 33/06* | (2006.01) |
| *C09J 133/02* | (2006.01) |
| *C08K 3/10* | (2006.01) |

(52) U.S. Cl.
CPC .............. *C09J 133/02* (2013.01); *C08K 3/10* (2013.01); *C08K 5/098* (2013.01)
USPC ........................ 524/394; 524/556; 524/561

(58) Field of Classification Search
USPC .......................................... 524/394, 556, 561
See application file for complete search history.

(56) References Cited

U.S. PATENT DOCUMENTS

| | | | |
|---|---|---|---|
| 3,532,708 A | 10/1970 | Blance | |
| 3,677,985 A | 7/1972 | Sirota et al. | |
| 3,740,366 A * | 6/1973 | Sanderson et al. ............ | 524/398 |
| 3,769,254 A | 10/1973 | Anderson et al. | |
| 3,925,282 A | 12/1975 | Davis et al. | |
| 3,929,703 A | 12/1975 | Weymann et al. | |
| 3,932,329 A | 1/1976 | Lakshmanan | |
| 3,997,487 A | 12/1976 | Rees et al. | |
| 4,014,831 A | 3/1977 | Bock et al. | |
| 4,045,517 A | 8/1977 | Guerin et al. | |
| 4,346,196 A | 8/1982 | Hoh et al. | |
| 4,354,008 A | 10/1982 | Skoultchi | |
| 4,360,638 A | 11/1982 | Bartman | |
| 4,423,182 A | 12/1983 | Bartman | |
| 4,619,979 A | 10/1986 | Kotnour et al. | |
| 4,680,333 A | 7/1987 | Davis | |
| 4,725,384 A | 2/1988 | Du Vernet | |
| 4,833,179 A | 5/1989 | Young et al. | |
| 4,843,134 A | 6/1989 | Kotnour et al. | |
| 4,851,278 A | 7/1989 | Enanoza | |
| 5,149,745 A | 9/1992 | Owens et al. | |
| 5,252,662 A | 10/1993 | Su et al. | |
| 5,489,501 A | 2/1996 | Torii et al. | |
| 5,637,646 A | 6/1997 | Ellis | |
| 6,294,249 B1 | 9/2001 | Hamer et al. | |
| 6,653,408 B1 | 11/2003 | St. Clair | |
| 6,720,387 B1 | 4/2004 | Stark et al. | |
| 6,800,680 B2 | 10/2004 | Stark et al. | |
| 6,805,954 B2 | 10/2004 | Silverberg et al. | |
| 6,928,794 B2 | 8/2005 | Hamer et al. | |
| 2004/0180208 A1 | 9/2004 | Bailey et al. | |
| 2007/0021545 A1* | 1/2007 | Husemann et al. ............ | 524/431 |
| 2008/0214712 A1 | 9/2008 | Boupat et al. | |

FOREIGN PATENT DOCUMENTS

| | | |
|---|---|---|
| JP | 09-031436 | 2/1997 |
| JP | 2001-172599 | 6/2001 |
| JP | 2002-155259 | 5/2002 |
| WO | WO 97/33945 | 9/1997 |
| WO | WO 02/36177 | 5/2002 |
| WO | WO 2008/021923 | 2/2008 |

OTHER PUBLICATIONS

International Search Report, PCT/US2010/037878, mailed Sep. 15, 2010, 3 pages.
ASTM D 3330/D3330M-04, "Standard Test Method for Peel Adhesion of Pressure-Sensitive Tape", ASTM International, 2004, 6 pages.
ASTM D 3654/D 3654M-06, "Standard Methods for Shear Adhesion of Pressure-Sensitive Tapes", ASTM International, 2006, 6 pages.
B.P. Grady, "Review and Critical Analysis of the Morphology of Random Ionomers Across Many Length Scales", *Polymer Engineering and Science*, Jun. 2008, vol. 48, No. 6, pp. 1029-1051.
Rudolph et al., "The Thermal Decomposition of Zinc Acetylacetonate Hydrate", Inorganic Chemistry, 1964, vol. 3, No. 9, pp. 1317-1318.
Isa et al., "Thermal Decomposition of Magnesium Acetate Tetrahydrate u\Under Self-Generated Atmosphere", *Thermochimica Acta*, 1984, 75, pp. 197-206.

\* cited by examiner

*Primary Examiner* — Ling Choi
*Assistant Examiner* — Ronald Grinsted
(74) *Attorney, Agent, or Firm* — Dena M. Ehrich

(57) ABSTRACT

A method of making a pressure-sensitive hot melt adhesive. The method includes extruding a melt composition that includes a polymer, wherein the polymer has acidic groups covalently attached thereto, and a metal salt hydrate, wherein the metal salt hydrate has a melting point that is less than the maximum processing temperature.

14 Claims, No Drawings

METHOD OF MAKING A HOT MELT PRESSURE-SENSITIVE ADHESIVE

CROSS-REFERENCE TO RELATED APPLICATIONS

This application is a national stage filing under 35 U.S.C. 371 of PCT/US2010/037878, filed Jun. 9, 2010, which claims priority to U.S. Provisional Application No. 61/218,173, filed Jun. 18, 2009, and the disclosure of which is incorporated by reference in its entirety herein.

TECHNICAL FIELD

The present disclosure relates broadly to pressure-sensitive hot melt adhesives.

BACKGROUND

Pressure-sensitive adhesives (PSAs) possess properties including at least: (1) aggressive and permanent tack, (2) adherence to an adherend with no more than finger pressure, (3) sufficient ability to hold onto the adherend, and optionally (4) sufficient cohesive strength to be removed cleanly from the adherend.

Hot melt pressure-sensitive adhesives (hereinafter HMPSAs) are widely used in industry. In particular, acrylic HMPSAs are often used in applications where color and/or aging characteristics are important. Typically, acrylic HMPSAs are crosslinked in order to provide desirable shear properties, and various techniques have been used.

One method of crosslinking acrylic HMPSAs involves using irradiation (UV or electron beam); however, such methods generally require significant processing time and specialized equipment. Furthermore, the presence of tackifiers and/or plasticizers in the adhesive formulation can greatly reduce the efficiency of radiation-induced crosslinking.

Another method of crosslinking acrylic HMPSAs is to use metal ions to form ionic crosslinks with the carboxylic acid groups in the polymer chains. The mechanism of ionic crosslinking is thought to be the result of an ionomeric effect. Ionomers are polymers that consist of nonpolar monomers and also ion-containing monomers. Since the nonpolar segments and the polar ionic groups of the polymer are energetically incompatible, microphase separation occurs to produce ion-rich domains (for example, see B. P. Grady, *Polymer Engineering and Science*, June 2008, vol. 48, No. 6, pp. 1029-1051). The morphology of ion-rich domains dispersed within a softer, nonpolar bulk phase can lead to physical crosslinking, similar to that of block copolymers. Ideally, a pressure-sensitive adhesive ionomer would have sufficiently low viscosity at high temperatures to facilitate coating, and high viscosity at lower temperatures to provide good shear properties.

To prepare an ionically crosslinked HMPSA, a metallic crosslinking agent is typically mixed with a polymer having anionic functional groups. To accomplish this, a solution route is usually employed, whereby metal salts are dissolved into a solution, then added to a polymer solution, followed by removal of the solvent. This solution method requires the use of organic solvents, which may be costly and may raise handling and/or disposal issues.

SUMMARY

In one aspect, the present disclosure provides a method of making a hot melt pressure-sensitive adhesive composition, the method comprising melt compounding, at or below a maximum processing temperature, components comprising:
an acidic polymer; and
a metal salt hydrate, wherein the metal salt hydrate has a melting point that is less than the maximum processing temperature.

In some embodiments, the components further comprise a tackifier. In some embodiments, the components further comprise a blend compatible diluent polymer. In some embodiments, the polymer comprises an acrylic polymer. In some embodiments, the acidic groups comprise at least one of carboxyl groups, phosphono groups, sulfo groups, and combinations thereof. In some embodiments, the metal salt hydrate comprises an alkaline earth metal. In some embodiments, the metal salt hydrate comprises a transition metal. In some embodiments, the metal salt hydrate comprises a Group 13 metal. In some embodiments, the metal salt hydrate has a melting point in a range of from 30 to 170 degrees Celsius (° C.). In some embodiments, the components are essentially free of volatile organic solvents. In some embodiments, the melt compounding occurs in an extruder.

Advantageously, in some embodiments, the present disclosure provides a facile solvent-free method of preparing HMPSAs that typically exhibit superior shear and/or optical properties if compared to HMPSAs prepared using metal salts that are not hydrates, used in equimolar concentrations based on the metal content.

Further, HMPSAs may be prepared according to the present disclosure at any thickness and in the presence of other additives (for example, tackifiers, plasticizer, fibers, flame retardants, fillers, and/or pigments), with a useful crosslink density throughout, in contrast to certain alternative methods for HMPSA preparation such as, for example, UV radiation and e-beam radiation processing.

As used herein,
the term "acidic group" refers to a group that substantially dissociates in water generating $H^+$ ions (for example, —C(=O)OH, —P(=O)$_2$(OH), and —S(=O)$_2$OH);
the term "acidic polymer" refers to a polymer having acidic groups covalently attached thereto;
the terms "Group 1" through "Group 13" refer to corresponding columns of the Periodic Table of the Elements;
the term "hydrate" refers to a solid compound containing water molecules combined in a definite ratio; for example, as an integral part of a crystallized metal complex;
the term "hydrocarbyl" refers to a univalent radical derived from a hydrocarbon;
the term "melt compounding" refers to a process in which at least one molten polymeric component is intimately mixed with at least one other component;
the term "melting point" (m.p.) as applied to a metal salt hydrate refers to a thermal transition in which the metal salt hydrate forms a fluid (for example, by the salt partially or completely dissolving into its own water of crystallization);
the term "maximum processing temperature" refers to the maximum temperature at which melt compounding is carried out;
the term "polymer" refers to a molecule (or a material composed of such molecules) of high relative molecular mass, the structure of which essentially comprises the multiple repetition of units derived, actually or conceptually, from molecules of low relative molecular mass; and
the term "transition metal" refers to an element belonging to "Group 3" through "Group 12" of the Periodic Table of the Elements.

DETAILED DESCRIPTION

The present disclosure provides a method of making a hot melt pressure-sensitive adhesive composition. The method comprises melt compounding, at or below a maximum processing temperature, components comprising: an acidic polymer; and a metal salt hydrate, wherein the metal salt hydrate has a melting point that is less than the maximum processing temperature.

Any type of acidic polymer (for example, a homopolymer or a copolymer) may be used in practice of the present disclosure including, for example, acrylic copolymers and olefin-acrylic copolymers provided that it is, or can be formulated to be, a melt processible PSA. Additionally, a plethora of acidic polymers are available commercially. Typically, the acidic polymer is a copolymer, more typically an acrylic copolymer. While the acidic groups may comprise any suitable group or combination of groups, typically the acidic groups are carboxyl groups. Acidic groups are typically introduced into the polymer during its synthesis by inclusion of one or more acidic monomers, although this is not a requirement.

Exemplary useful acidic monomers include those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, beta-carboxyethyl acrylate, 2-sulfoethyl methacrylate, styrenesulfonic acid, 2-acrylamido-2-methylpropanesulfonic acid, vinylphosphonic acid, and combinations thereof. Due to their availability, more typically ethylenically unsaturated carboxylic acids are selected as acidic monomers. As used herein, the term "acidic monomer" also includes monomers having latent acid groups. Examples include maleic anhydride, glutaric anhydride, itaconic anhydride, and t-butyl acrylates and methacrylates.

If the acidic polymer is a copolymer, the ratio of acidic monomers to non-acidic copolymerizable monomers utilized generally varies depending on desired properties of the resulting HMPSA. To achieve pressure sensitive adhesive properties, the acidic polymer is typically tailored to have a glass transition temperature ($T_g$) of less than about 0° C.

Generally, as the proportion of acidic monomers used in preparing the acidic copolymer increases, cohesive strength of the resulting adhesive increases. Exemplary acrylic acidic copolymers are derived from: one or more monomers comprising about 2 percent by weight to about 30 percent by weight, typically about 2 percent by weight to about 15 percent by weight, of a copolymerizable acidic monomer; and from one or more monomers comprising about 40 percent by weight to about 98 percent by weight, typically at least 70 percent by weight, more typically at least 85 percent by weight, most typically about 90 percent by weight, of at least one alkyl (meth)acrylate monomer that, as a homopolymer, has a $T_g$ of less than about 0° C. Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl acrylate, and combinations thereof.

Optionally, one or more alkyl (meth)acrylate monomers which, as homopolymers, have a $T_g$ greater than 0° C. may be included in the acidic polymer. Examples include methyl acrylate, methyl methacrylate, ethyl acrylate, ethyl methacrylate, isobornyl acrylate, benzyl methacrylate, n-butyl methacrylate, cyclohexyl acrylate, cyclohexyl methacrylate, ethyl methacrylate, n-hexadecyl acrylate, n-hexadecyl methacrylate, isobornyl methacrylate, stearyl acrylate, stearyl methacrylate, 2-phenoxyethyl methacrylate, isopropyl methacrylate, and propyl methacrylate.

Non-alkyl (meth)acrylate monomers and/or non-acidic monomers may also be optionally included in the acid polymer. Examples include acrylonitrile, vinyl esters (for example, vinyl acetate, vinyl propionate), styrene and substituted styrenes (for example, alpha-methyl styrene, vinyl toluene), vinyl chloride, ethylene, propylene, and butylene.

Methods for preparing acidic polymers such as, for example, the polymers discussed hereinabove, are well known to one of ordinary skill in the adhesives art. For example, the acidic polymer can typically be prepared by conventional free-radical polymerization methods, including solution, radiation, bulk, dispersion, emulsion, and suspension processes.

In one solution polymerization method, monomers, along with a suitable inert organic solvent, are charged into a four-neck reaction vessel that is equipped with a stirrer, a thermometer, a condenser, an addition funnel, and a temperature regulator. A concentrated thermal free-radical initiator solution is added to the addition funnel. The whole reaction vessel, addition funnel, and their contents are then purged with nitrogen to create an inert atmosphere. Once purged, the solution within the vessel is heated to an appropriate temperature to activate the free radical initiator to be added, the initiator is added, and the mixture is stirred during the course of the reaction. A 98 percent to 99 percent conversion should be obtained in about 20 hours.

Another polymerization method is ultraviolet (UV) radiation-initiated photopolymerization of the monomer mixture. After pre-polymerization to a coatable viscosity, the mixture, along with a suitable photoinitiator, is coated onto a flexible carrier web and polymerized in a sufficiently inert (that is, essentially oxygen free) atmosphere (for example, a nitrogen atmosphere). A sufficiently inert atmosphere can be achieved by covering a layer of the photoactive coating with a plastic film that is substantially transparent to ultraviolet radiation and irradiating through the plastic film in air using low intensity, fluorescent-type ultraviolet lamps that generally give a total radiation dose of about 500 milliJoules/centimeter$^2$ (mJ/cm$^2$).

Bulk polymerization methods, such as the continuous free-radical polymerization method described in U.S. Pat. Nos. 4,619,979 and 4,843,134 (both to Kotnour et al.); the essentially adiabatic polymerization methods using a batch reactor described in U.S. Pat. No. 5,637,646 (Ellis); suspension polymerization processes described in U.S. Pat. No. 4,833,179 (Young et al.); and methods described for polymerizing packaged pre-adhesive compositions described by Hamer et al. in PCT Publication No. WO 97/33945 may also be utilized to prepare the polymers.

Suitable thermal free-radical initiators which may be utilized include, for example: azo compounds (for example, 2,2'-azobis(isobutyronitrile)); hydroperoxides (for example, tert-butyl hydroperoxide); and peroxides (for example, benzoyl peroxide and cyclohexanone peroxide). Suitable free-radical photoinitiators useful according to the disclosure include, for example,: benzoin ethers (for example, benzoin methyl ether and benzoin isopropyl ether; substituted benzoin ethers (for example, anisole methyl ether); substituted acetophenones (for example, 2,2-diethoxyacetophenone and 2,2-dimethoxy-2-phenyl acetophenone); substituted alpha-ketols (for example, 2-methyl-2-hydroxy propiophenone); aromatic sulfonyl chlorides (for example, 2-naphthalene sulfonyl chloride); and photoactive oximes (for example, 1-phenyl-1,2-propanedione-2-(ethoxycarbonyl)oxime).

For both thermal- and radiation-induced polymerizations, the initiator is typically present in an amount of about 0.05 percent to about 5.0 percent by weight based upon the total weight of the monomers used.

Typically, the acidic polymer (or polymers) is polymerized without solvent. Yet, suitable inert organic solvent, if desired, may be any organic liquid which is sufficiently inert to the reactants and product such that it will not otherwise adversely affect the reaction. Such solvents include ethyl acetate, acetone, methyl ethyl ketone, and mixtures thereof. If used, the amount of solvent is generally about 30-80 percent by weight based on the total weight of the reactants (monomer and initiator) and solvent. In such cases, the solvent is generally removed from the polymers.

Chain transfer agents can also be utilized when polymerizing the polymers described herein to control the molecular weight of the polymers. Suitable chain transfer agents include halogenated hydrocarbons (for example, carbon tetrabromide) and sulfur compounds (for example, lauryl mercaptan, butyl mercaptan, isooctyl thioglycolate, ethanethiol, and 2-mercaptoether). The amount of chain transfer agent that is useful depends upon the desired molecular weight and the type of chain transfer agent. Organic solvents (for example, toluene, isopropanol, and ethyl acetate) can also be used as chain transfer agents, but they generally are not as active as, for example, sulfur compounds. If used, the chain transfer agent is typically present in an amount of from about 0.001 to about 10 parts; more typically 0.01 to about 0.5 parts; and even more typically from about 0.02 to about 0.2 parts based on the total weight of the monomers.

Suitable metal salt hydrates typically have melting transitions in a range of from 30° C. to 170° C., more typically in a range of from 40° C. to 130° C., although melting transitions outside these ranges (for example, higher than these ranges) may also be used. In general, it is desirable that the metal salt hydrate melts to form a solution of the metal salt in the water of hydration; however, useful results may also be obtained using metal salt hydrates that only partially dissolve in the water of hydration.

Without wishing to be bound by theory, it is believed that by dissolving the metal salt in the water of hydration, it is more intimately mixed with the other components during melt blending than a solid particulate form of the metal salt, wherein only metal ions on the surface of the particles would be available for bonding. Accordingly, it is generally desirable that the metal salt hydrate melts to form a solution of the metal salt in the water of hydration; however, useful results may also be obtained using metal salt hydrates that only partially dissolve in the water of hydration.

To facilitate effective mixing of the components, high shear mixing is typically desirable. Since the processing temperatures at which melt mixing occurs may be in excess of the boiling point of water (for example, as elevated by the metal salt dissolved therein), it is generally desirable that mixing of the metal salt into the acidic polymer occurs rapidly, typically before a major portion of the water of hydration has the opportunity to evaporate.

Exemplary metal salt hydrates include hydrates of alkali metal (that is, Group 1 metal) salts (for example, Li, Na, and K), alkaline earth metal (that is, Group 2 metal) salts (for example, Mg, Ca, and Ba), transition metal (that is, Groups 3-12 metal) salts (for example, Zn, Ti, Fe, V, Cu, Ag, Mn, and Zr), Group 13 metal salts (for example, Al and In), and combinations thereof. Examples include aluminum ammonium sulfate dodecahydrate (m.p.=94° C.), aluminum bromide hexahydrate (m.p.=93° C.), aluminum chloride hexahydrate (m.p.=100° C.), aluminum nitrate nonahydrate (m.p.=73° C.), aluminum sulfate octadecahydrate (m.p.=86° C.), barium acetate monohydrate (m.p.=110° C.), barium chlorate monohydrate (m.p.=120° C.), barium chloride dihydrate (m.p.=120° C.), barium hydroxide octahydrate (m.p.=78° C.), calcium acetate monohydrate (m.p.=150° C.), calcium hydrogen phosphate dihydrate (m.p.=100° C.), calcium nitrate tetrahydrate (m.p.=40° C.), calcium nitrite monohydrate (m.p.=100° C.), calcium chloride hexahydrate (m.p.=30° C.), cobalt (II) acetate tetrahydrate (m.p.=140° C.), cobalt (II) chlorate hexahydrate (m.p.=61° C.), cobalt (II) chloride hexahydrate (m.p.=87° C.), cobalt (II) potassium sulfate hexahydrate (m.p. 75° C.), cobalt (II) sulfate heptahydrate (m.p.=41° C.), copper (II) acetate monohydrate (m.p.=145° C.), iron (II) chloride tetrahydrate (m.p.=105° C.), iron (III) chloride hexahydrate (m.p.=37° C.), iron (III) nitrate nonahydrate (m.p.=47° C.), lithium acetate dihydrate (m.p.=58° C.), lithium chloride monohydrate (m.p.=98° C.), magnesium acetate tetrahydrate (m.p.=76° C.), magnesium bromide hexahydrate (m.p.=165° C.), magnesium chloride hexahydrate (m.p.=100° C.), magnesium nitrate hexahydrate (m.p.=95° C.), magnesium tetrahydrogen phosphate dihydrate (m.p.=90° C.), magnesium thiosulfate hexahydrate (m.p.=170° C.), potassium aluminum sulfate dodecahydrate (m.p.=100° C.), potassium oxalate monohydrate (m.p.=160° C.), sodium acetate trihydrate (m.p.=58° C.), sodium carbonate decahydrate (m.p.=34° C.), sodium dihydrogen phosphate dihydrate (m.p.=60° C.), sodium dithionate dihydrate (m.p.=110° C.), sodium hydrogen phosphate dodecahydrate (m.p.=35° C.), sodium hydrogen sulfide dihydrate (m.p.=55° C.), sodium phosphate dodecahydrate (m.p.=75° C.), sodium sulfate decahydrate (m.p.=32° C.), sodium thiophosphate pentahydrate (m.p.=50° C.), sodium thiosulfate pentahydrate (m.p.=50° C.), strontium bromide hexahydrate (m.p.=88° C.), strontium chloride hexahydrate (m.p.=100° C.), strontium iodide hexahydrate (m.p.=120° C.), zinc acetate dihydrate (m.p.=100° C.), zinc acetylacetonate monohydrate (m.p.=130° C.), zinc bromate hexahydrate (m.p.=100° C.), zinc bromide dihydrate (m.p.=37° C.), zinc nitrate hexahydrate (m.p.=36° C.), zinc oxalate dihydrate (m.p.=100° C.), zinc tartrate dihydrate (m.p.=150° C.), zinc sulfate heptahydrate (m.p.=100° C.), and zirconium (IV) sulfate tetrahydrate (m.p.=100° C.), and combinations thereof.

Optionally, the components may comprise one or more tackifier(s), plasticizer(s), flame retardant(s), UV stabilizer(s), filler(s), hindered amine light stabilizer(s), antioxidant(s), colorant(s), and/or crosslinker(s) (for example, photocrosslinker). Volatile organic solvent may also be added, but as it tends to interfere with melt compounding processes, it is typically avoided. That is, the components are substantially free (for example, contain less than 2 percent or even less than 0.5 percent) of volatile organic solvent. Most typically, the components are essentially free of volatile organic solvents; that is, they are free of such solvents other than in trace amounts associated with the components themselves.

To adjust the tack level, one or more tackifiers may be added to the components before or during melt blending. The amount by weight of the tackifiers is typically from 5 to 150 parts by weight, more typically from 10 to 100 parts by weight, per 100 parts by weight of the acidic polymer(s), although other amounts may also be used.

Exemplary tackifiers include natural or chemically modified rosins formed by disproportionation or isomerization, polymerization, dimerization and/or hydrogenation. They may be present in their salt form (for example, with monovalent or polyvalent counterions) or, more typically, in their esterified form. Alcohols used for the esterification may be monohydric or polyhydric; for example, methanol, ethanediol, diethylene glycol, triethylene glycol, 1,2,3-propanetriol, and pentaerythritol. Additional tackifiers include hydrocarbon resins, for example, coumarone-indene resins, polyterpene resins, hydrocarbon resins based on unsaturated hydrocarbon compounds, such as butadiene, pentene, methylbutene, isoprene, piperylene, divinylmethane, pentadiene, cyclopentene, cyclopentadiene, cyclohexadiene, styrene, alpha-methylstyrene, and vinyltoluene.

If desired, one or more blend compatible polymers (that is, compatible with the acidic polymer(s)) may be optionally included with the components being melt compounded.

Selection of the components and their amounts will be such that the resultant melt blended composition meets the physical requirements of being a pressure sensitive adhesive at ambient temperature (typically 20° C. to 30° C.), and being melt processible (that is, being a HMPSA).

Melt compounding of the components may be done by any melt compounding method that results in a substantially homogenous distribution of the acidic polymer and the metal salt. For example, the components can be melt-compounded by sequentially adding the acidic polymer, optional additive(s), and metal salt hydrate in a physical mixing device. Alternatively, the components can be melt-compounded by sequentially adding the acidic polymer, metal salt hydrate, and optional additives in a physical mixing device. If a blend compatible diluent polymer is included, it is typically blended with the acidic polymer prior to addition of the other components, but this is not a requirement.

Physical blending devices that provide dispersive mixing, distributive mixing, or a combination of dispersive and distributive mixing under polymer melt conditions are useful in preparing homogenous blends. Both batch and continuous methods of physical blending can be used. Examples of batch methods include using a BRABENDER PREP CENTER, available from C.W. Brabender Instruments, Inc. of South Hackensack, N.J.) or an internal mixing and roll milling device (for example, as available BANBURY from FARREL COMPANY of Ansonia, Conn.). Examples of continuous melt compounding devices include single screw extruders, twin-screw extruders, reciprocating single screw extruders, cavity transfer mixers, and pin barrel single screw extruders.

Processing temperatures will necessarily be a function of the specific components chosen. They must be sufficiently high that melt flow of the acidic polymer and "melting" of the metal salt hydrate occurs, but not so high that polymer decomposition or other unwanted processes occur to any significant extent. Selection of such conditions is well within the capability of one of ordinary skill in the HMPSA art.

Once melt compounded the HMPSA composition is typically ready for use. For example, the HMPSA can be applied to: sheeting products (for example, decorative, reflective, and graphical); label stock; tape backings such as, for example, a nonwoven, paper, polypropylene (for example, biaxially oriented polypropylene (BOPP)), polyethylene, or polyester (for example, polyethylene terephthalate) film backing; blown microfibers, or a release liner (for example, a siliconized liner). In some embodiments, it may be desirable to further heat the adhesive after melt coating.

Objects and advantages of this disclosure are further illustrated by the following non-limiting examples, but the particular materials and amounts thereof recited in these examples, as well as other conditions and details, should not be construed to unduly limit this disclosure.

EXAMPLES

All parts, percentages, and ratios in the examples and the rest of the specification are based on weight, unless noted otherwise.

Materials

Tackifier FORAL 85LB, a glycerol ester of highly hydrogenated refined wood rosin, was obtained from Hercules Inc. of Wilmington, Del.

ESCOREZ 2520, an aliphatic/aromatic hydrocarbon resin, was obtained from Exxon Mobil Corp. of Houston, Tex.

Magnesium acetate tetrahydrate (MAT) was obtained from GFS Chemicals Inc. of Powell, Ohio.

Anhydrous magnesium acetate was obtained from City Chemical LLC of West Haven, Conn.

Anhydrous magnesium hydroxide was obtained from Alfa Aesar of Ward Hill, Mass.

Sodium acetate trihydrate was obtained from J.T. Baker Inc. of Phillipsburg, N.J.

Anhydrous sodium acetate was obtained from EMD Chemicals Inc. of Gibbstown, N.J.

Test Methods

Prior to adhesive testing, the adhesives were laminated onto primed, optical-grade, 2 mil thick poly(ethylene terephthalate) (PET) liner (HOSTAPHAN 3SAB) from Mitsubishi Polyester Film, Inc. of Greer, SC unless noted otherwise.

The adhesives were conditioned in a constant temperature (23° C.) and humidity (50% relative humidity, RH) room (CTH room) for at least 18 hours before testing. The data is reported as an average of two measurements.

180 Degree Peel Adhesion To Glass:

In a CTH room, a half inch-wide strip of the adhesive was laminated (using a 4.5 lb roller) onto EAGLE 2000 glass from Corning, Inc. of Corning, N.Y. After a dwell time of 15 minutes, a 180° peel test was performed using a Model 3M/90 slip/peel tester (manufactured by Instrumentors, Inc., Strongville, Ohio) at 12"/min (30 cm/min), with data collected and averaged over 10 seconds, according to ASTM Test Method Designation: D 3330/D 3330M-04 "Standard Test Method for Peel Adhesion of Pressure-Sensitive Tape". The observed mode of failure is noted: coh=cohesive failure, clean=interfacial adhesion failure between the adhesive and the substrate, 2 bond=interfacial adhesion failure between the adhesive and the tape backing.

23° C./50% RH Shear Holding Power On Stainless Steel (SS):

Following ASTM Designation: D 3654/D 3654M-06 "Standard Test Methods for Shear Adhesion of Pressure-Sensitive Tapes", with exceptions as noted below, a 0.5" (1.3 cm) wide strip of adhesive was laminated (using a 4.5 lb (2.0 kg) roller) onto a stainless steel panel, covering a 0.5"×0.5" (1.3 cm×1.3 cm) area of the panel. A 1 kg weight was used as the static load, and the test samples were placed on an automated timing apparatus in the CTH room (23° C./50% RH). The tests were stopped if no failure occurred by 10,000 minutes. The mode of failure is cohesive failure, unless indicated otherwise.

70° C. Shear Holding Power On Stainless Steel:

Following ASTM Designation: D 3654/D 3654M-06, a 0.5" (1.3 cm), with exceptions as noted below, wide strip of adhesive was laminated (using a 4.5 lb roller) onto a stainless steel panel, covering a 0.5"×1" (1.3 cm×2.5 cm) area of the panel. A 0.5 kg weight was used as the static load, and the test samples were placed on an automated timing apparatus in a 70° C. oven. The tests were stopped if no failure occurred by 10,000 minutes. The mode of failure is cohesive failure, unless indicated otherwise.

180 Degree Peel Adhesion To Stainless Steel:

Following ASTM Designation: D 3330/D 3330M-04, with exceptions as noted below, a specimen of 1" (2.5 cm) wide by approximately 12" (30 cm) long is cut in the machine direction and tested within five minutes after unwinding from the role of tape. The test panel is prepared by washing with diacetone alcohol followed by three heptane washes. Specimen is then centered along the narrow side of the panel and rolled onto the panel twice in each direction at approximately 24 in/min (10 mm/s). The free end of the specimen is doubled back and peeled approximately 1" (2.5 cm) from the panel. The panel from which the specimen has been removed is clamped into the lower jaw of a tensile tester and the specimen is clamped into the upper jaw of the tensile tester. The crosshead starts in motion within 1 minute of the completion of rolldown step and the peel adhesion is recorded in oz/in (kg/cm).

23° C./50% RH Shear Holding Power On Fiberboard (FB):

Following ASTM Designation: D 3654/D 3654M-06, with exceptions as noted below, about 4" (10 cm) of one end of the tape specimen is applied to the fiberboard surface and the panel at a right angle to the paper covered edge of the panel, and the specimen is rolled twice in each direction at 24"/min (61 cm/min). The free end of the tape specimen is then attached to the clip or hook, folding the specimen end over the hook and onto itself. The opposite end of the specimen is then carefully peeled back so as to reduce fiber pulling to a minimum to leave 0.5" (1.3 cm), using the 0.5" (1.3 cm) cut-off block. The panel is placed into the shear stand while immediately a 1 kg mass is hung. The time until the bond fails or terminates is measured in minutes.

Preparation of Copolymer Used in Hot Melt Pressure Sensitive Adhesive:

The copolymer of 2-ethylhexyl acrylate (2EHA), butyl acrylate (BA), and acrylic acid (AA) was bulk polymerized under UV light and sealed in ethylene vinyl acetate film pouches as described in U.S. Pat. No. 6,294,249 (Hamer et al.). Two sheets of ethylene vinyl acetate were heat sealed on the lateral edges and the bottom to form a rectangular pouch on a liquid form, fill, and seal machine. The pouch was then filled with a pressure sensitive adhesive composition having 47.75 parts 2EHA, 47.75 parts BA, 4.5 parts acrylic acid (AA), 0.2 parts of 2,2-dimethoxy-1,2-diphenylethan-1-one photoinitiator (available as IRGACURE 651 from Ciba Specialty Chemicals Inc. of Hawthorne, N.Y.) per 100 parts of total monomer ("phr"), 0.02 phr isooctyl thioglycolate, and 0.4 phr octadecyl-3-(3,5-di-tert-butyl-4-hydroxyphenyl)-propionate antioxidant (available as IRGANOX 1076 from Ciba Specialty Chemicals Inc.). The filled package was then heat sealed at the top in the cross direction through the monomer to form individual pouches measuring 13.4 cm by 4.3 cm by about 0.4 cm thick containing 27 grams (g) of composition. The pouches were placed in a water bath that was maintained between about 16° C. and 32° C. and exposed to ultraviolet radiation (supplied by lamps having about 90 percent of the emissions between 300 and 400 nanometers (nm), and a peak emission at 351 nm) at an intensity of 4.55 mW/cm$^2$ for 21 minutes.

Examples 1-2 and Comparative Examples C1-C4

Hot melt pressure sensitive adhesives were mixed together and coated using a static shear mixer equipped with a coating die. The temperature of the mixing chamber and die were set to 300° F. To the hot chamber were added the copolymer, FORAL 85LB, ESCOREZ 2520, and the crosslinker as specified in Table 1. Also included are comparative examples using anhydrous salts as specified in Table 1 (Comparative Examples C-2, C-3 and C-4) and a control comparative example which did not contain any crosslinker (Comparative Example C-1). The air in the chamber was evacuated by a water aspirator for 1 min. The molten composition was passed repeatedly through a static shear mixer for 160 cycles. The mixture was then extruded between differential release liners to produce a PSA film.

Table 2 reports results from testing of samples aged at CTH room for 1 week. Table 3 reports results from testing of samples aged at 110° C. for 20 min, then in CTH room for 1 day. Table 4 reports results of adhesion testing on fiberboard (FB) and stainless steel (SS).

In Table 4, the adhesive samples with and without MAT were tested using different substrates. For the shear test, fiberboard (FB) was used as the substrate, and for the peel test, stainless steel (SS) was used as the substrate. Prior to these tests, the adhesive was laminated onto 2-mil (50 micrometer) polypropylene film.

TABLE 1

| | | AMOUNT in grams | | | | |
|---|---|---|---|---|---|---|
| | CROSSLINKER | Crosslinker | Polymer 2EHA/BA/AA | FORAL 85LB | ESCOREZ 2520 | APPEARANCE OF EXTRUDATE |
| COMPARATIVE EXAMPLE C-1 | none | 0 | 26.56 | 21.25 | 2.79 | homogeneous, clear, light yellow |
| COMPARATIVE EXAMPLE C-2 | anhydrous magnesium acetate | 0.78 (5.5 mmol) | 26.56 | 21.25 | 2.81 | heterogeneous (white undissolved particles in light yellow polymer matrix) |
| EXAMPLE 1 | magnesium acetate tetrahydrate | 1.17 (5.5 mmol) | 26.53 | 21.22 | 2.79 | homogeneous, clear, light yellow |
| COMPARATIVE EXAMPLE C-3 | anhydrous magnesium hydroxide | 0.32 (5.5 mmol) | 26.59 | 21.27 | 2.79 | heterogeneous (white undissolved particles in light yellow polymer matrix) |
| COMPARATIVE EXAMPLE C-4 | anhydrous sodium acetate | 1.95 (24 mmol) | 27.04 | 21.63 | 2.84 | heterogeneous (white undissolved particles in light yellow polymer matrix) |
| EXAMPLE 2 | sodium acetate trihydrate | 3.24 (24 mmol) | 27.04 | 21.63 | 2.84 | homogeneous, cloudy, light yellow |

TABLE 2

| PSA | Thickness, mil (mm) | 23° C./50% RH SHEAR (0.5" × 0.5", 1 kg, SS) | 70° C. SHEAR (1" × 0.5", 500 g, SS) | 180° peel (12"/min, glass, 15 min dwell) oz/in (kg/cm) | Adhesive Failure Mode |
|---|---|---|---|---|---|
| COMPARATIVE EXAMPLE C-1 | 3.0 (0.076) | 2 min | <1 min | 123 (1.37) | coh |
| COMPARATIVE EXAMPLE C-2 | 3.5 (0.089) | 41 min | 3.5 min | 184 (2.05) | coh |
| EXAMPLE 1 | 2.5 (0.064) | 422 min | >10000 min (10 mm creep) | 101 (1.13) | clean |
| COMPARATIVE EXAMPLE C-3 | 2.3 (0.058) | <1 min | <1 min | 125 (1.39) | coh |
| COMPARATIVE EXAMPLE C-4 | 3.0 (0.076) | 16 min | 1 min | 131 (1.46) | coh |
| EXAMPLE 2 | 3.2 (0.081) | 21 min | 1 min | 12.1 (0.13) | clean |

TABLE 3

| PSA | Thickness, mil (mm) | 23° C./50% RH SHEAR (0.5" × 0.5", 1 kg, SS) | 70° C. SHEAR (1" × 0.5", 500 g, SS) | 180° peel (12"/min, glass, 15 min dwell) oz/in (kg/cm) | Adhesive Failure Mode |
|---|---|---|---|---|---|
| COMPARATIVE EXAMPLE C-1 | 3.0 (0.076) | 2 min | <1 min | 121 (1.35) | coh |
| COMPARATIVE EXAMPLE C-2 | 3.5 (0.089) | 165 min | 3888 min | 132 (1.47) | coh/2 bond |
| EXAMPLE 1 | 2.5 (0.064) | 5643 min | >10000 min (no creep) | 70.0 (0.78) | clean |
| COMPARATIVE EXAMPLE C-3 | 2.3 (0.058) | 1 min | <1 min | 126 (1.40) | coh |
| COMPARATIVE EXAMPLE C-4 | 3.0 (0.076) | 41 min | 1 min | 81.1 (0.90) | coh |
| EXAMPLE 2 | 3.2 (0.081) | 238 min | 3 min | 5.4 (0.060) | clean |

TABLE 4

| | 23° C./50% RH SHEAR (0.5" × 0.5", 1 kg, FB) | 180° PEEL (12"/min, SS, no dwell) |
|---|---|---|
| COMPARATIVE EXAMPLE C-1 | 6.9 min | >160 oz/in (>1.3 kg/cm) |
| EXAMPLE 1 | 8176 min | 63 oz/in (0.70 kg/cm) |

All patents and publications referred to herein are hereby incorporated by reference in their entirety. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A method of making a hot melt pressure-sensitive adhesive composition, the method comprising melt compounding, at or below a maximum processing temperature, components comprising:
   an acidic polymer; and
   a metal salt hydrate, wherein the metal salt hydrate has a melting point that is less than the maximum processing temperature, and further wherein the melt compounding is conducted by high shear mixing.

2. The method of claim 1, wherein the components further comprise a tackifier.

3. The method of claim 1, wherein the polymer comprises an acrylic polymer.

4. The method of claim 1, wherein acidic groups of the acidic polymer comprise at least one of carboxyl groups, phosphono groups, sulfo groups, and combinations thereof.

5. The method of claim 1, wherein acidic groups of the acidic polymer comprise carboxyl groups.

6. The method of claim 1, wherein the metal salt hydrate comprises an alkaline earth metal.

7. The method of claim 1, wherein the metal salt hydrate comprises magnesium acetate tetrahydrate.

8. The method of claim 1, wherein the metal salt hydrate comprises an alkali metal.

9. The method of claim 1, wherein the metal salt hydrate comprises a transition metal.

10. The method of claim 1, wherein the metal salt hydrate comprises a Group 13 metal.

11. The method of claim 1, wherein the metal salt hydrate has a melting point in a range of from 30° C. to 170° C.

12. The method of claim 1, wherein the components further comprise a blend compatible diluent polymer.

13. The method of claim 1, wherein the components are essentially free of volatile organic solvents.

14. The method of claim 1, wherein the metal salt hydrate comprises a crystalline metal salt hydrate.

* * * * *